United States Patent
Zang et al.

(10) Patent No.: US 10,911,382 B2
(45) Date of Patent: Feb. 2, 2021

(54) PERSONALIZED MESSAGE PRIORITY CLASSIFICATION

(71) Applicant: Futurewei Technologies, Inc., Plano, TX (US)

(72) Inventors: Hui Zang, Cupertino, CA (US); Jiangsheng Yu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 314 days.

(21) Appl. No.: 15/419,629

(22) Filed: Jan. 30, 2017

(65) Prior Publication Data

US 2018/0219817 A1    Aug. 2, 2018

(51) Int. Cl.
  *H04L 12/58*    (2006.01)
  *H04L 29/08*    (2006.01)

(52) U.S. Cl.
  CPC .............. *H04L 51/12* (2013.01); *H04L 51/04* (2013.01); *H04L 51/22* (2013.01); *H04L 51/26* (2013.01); *H04L 67/22* (2013.01); *H04L 67/322* (2013.01)

(58) Field of Classification Search
  None
  See application file for complete search history.

(56) References Cited

U.S. PATENT DOCUMENTS

| 7,890,590 B1* | 2/2011 | Cooley | H04L 51/12 706/20 |
| 8,972,307 B1* | 3/2015 | Servedio | H04L 51/12 706/12 |
| 2004/0167964 A1* | 8/2004 | Rounthwaite | H04L 51/12 709/206 |
| 2004/0215977 A1* | 10/2004 | Goodman | G06Q 10/107 726/22 |
| 2006/0010217 A1* | 1/2006 | Sood | H04L 51/12 709/206 |
| 2006/0047768 A1* | 3/2006 | Gellens | H04L 51/12 709/207 |

(Continued)

FOREIGN PATENT DOCUMENTS

| CN | 103136226 A | 6/2013 |
| CN | 103473218 A | 12/2013 |
| WO | 2015077158 A2 | 5/2015 |

OTHER PUBLICATIONS

PCT/CN2018/074038, ISR, Apr. 23, 2018.

*Primary Examiner* — Chris Parry
*Assistant Examiner* — Abderrahmen Chouat
(74) *Attorney, Agent, or Firm* — Vierra Magen Marcus LLP

(57) ABSTRACT

A system and method of automatically assigning a priority rank to messages. The system and method accesses a message data store and assigns a priority rank to each message. The priority rank is selected from a priority rank scale by, for each message, parsing the message for features present in the message and calculating a predicted intensity score for the message using a user-specific classifier. The classifier is trained from user training data which includes prior user messages on which a machine learning algorithm operates. The training data is labeled by scores calculated based on the actual activates performed by the user to each message. The priority rank of each message can be used to improve message processing in message processing systems.

20 Claims, 10 Drawing Sheets

| User actions | weights | actual value | assigned score | description | Activity score |
|---|---|---|---|---|---|
| read | 0.5 | 5 | 0.9 | how many times the email was read | 0.45 |
| reply word count | 0.05 | 150 | 0.7 | how many words are in the reply message | 0.035 |
| reply time spent | 0.05 | 5 min. | 0.3 | how much time used in composing the reply message | 0.015 |
| reply action delay | 0.2 | 4 hrs. | 0.1 | how much time elapse from opening the message to start composing the reply message | 0.02 |
| deleted without opening | -0.2 | No | 0 | | 0 |
| deleted after replying | -0.1 | Yes | 1 | | -0.1 |
| forwarded | 0.1 | No | 0 | | 0 |
| | | | | Total Activity Intensity Score = | 0.42 |

730

(56) References Cited

U.S. PATENT DOCUMENTS

| | | | |
|---|---|---|---|
| 2008/0097946 A1* | 4/2008 | Oliver | H04L 51/12 |
| | | | 706/46 |
| 2014/0189000 A1 | 7/2014 | Zhang et al. | |
| 2014/0189536 A1 | 7/2014 | Lange et al. | |
| 2018/0048595 A1* | 2/2018 | Dotan-Cohen | G06Q 10/1093 |

* cited by examiner

Figure 7A

| MSG. ID | Sender's Social Relationship | Length (words) | CC'ed | Number of Co-receipients | Keywords | Sender Forwarded | Sender replied | Intensity Score | Priority Rank |
|---|---|---|---|---|---|---|---|---|---|
| 1 | spouse | 150 | No | 0 | vacation, expense | No | Yes | 0.55 | 3 |
| 2 | friend | 100 | No | 3 | shopping, time | No | Yes | 0.1 | 1 |
| 3 | boss | 30 | Yes | 4 | deadline | Yes | No | 0.85 | 5 |
| 4 | colleague | 40 | Yes | 1 | book, papers | No | No | 0.15 | 2 |

| MSG ID | ACTION | DETAILS | SCORE |
|---|---|---|---|
| 1 | READ | READ 5 TIMES | 0.45 |
| 2 | DELETED | | -0.10 |
| 3 | SIT | Unread | 0.00 |
| 4 | REPLIED | 200 Words, 5 Min, Zero Wait | 0.80 |

| User actions | weights | actual value | assigned score | description | Activity score |
|---|---|---|---|---|---|
| read | 0.5 | 5 | 0.9 | how many times the email was read | 0.45 |
| reply word count | 0.05 | 150 | 0.7 | how many words are in the reply message | 0.035 |
| reply time spent | 0.05 | 5 min. | 0.3 | how much time used in composing the reply message | 0.015 |
| reply action delay | 0.2 | 4 hrs. | 0.1 | how much time elapse from opening the message to start composing the reply message | 0.02 |
| deleted without opening | -0.2 | No | 0 | | 0 |
| deleted after replying | -0.1 | Yes | 1 | | -0.1 |
| forwarded | 0.1 | No | 0 | | 0 |
| | | | | Total Activity Intensity Score = | 0.42 |

| | Non Activity Features | | | | | |
|---|---|---|---|---|---|---|
| MSG ID | Feature 1 | Feature 2 | Feature 3 | ... | Feature N | Predicted Score | Actual Score | Prediction Error |
| 1 | {Value} | {Value} | {Value} | ... | {Value} | 0.35 | 0.45 | 0.1 |
| 2 | {Value} | {Value} | {Value} | ... | {Value} | 0.1 | 0.05 | -0.05 |
| 3 | {Value} | {Value} | {Value} | ... | {Value} | 0.5 | 0.7 | 0.2 |
| 4 | | | | | | | | |

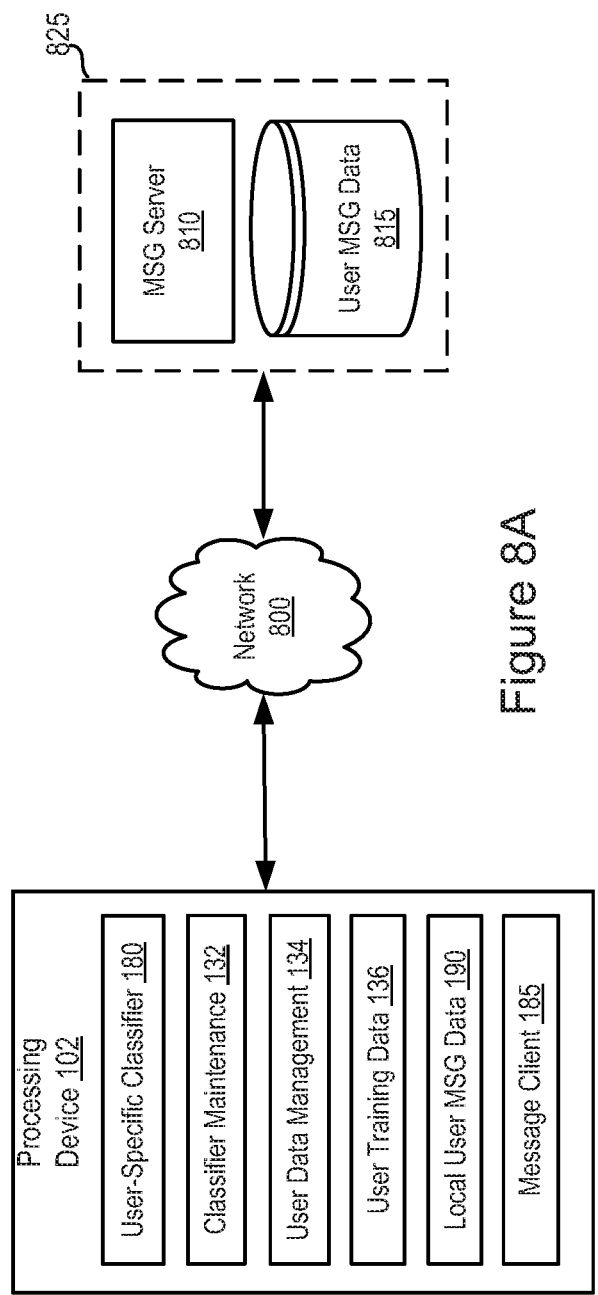
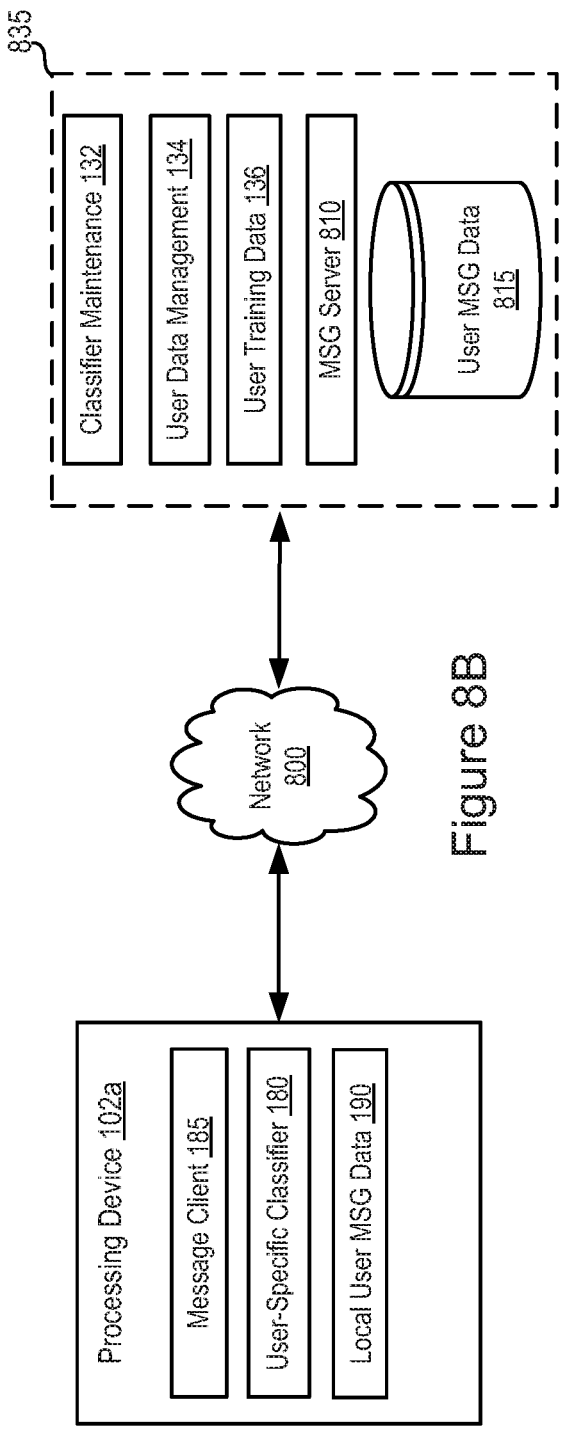

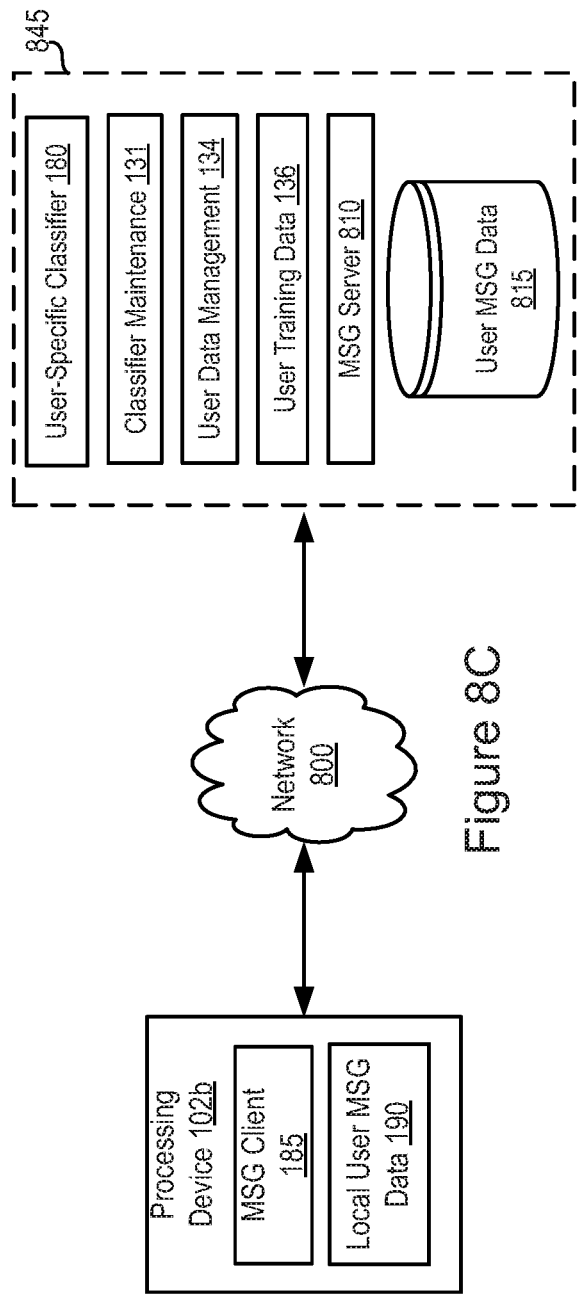
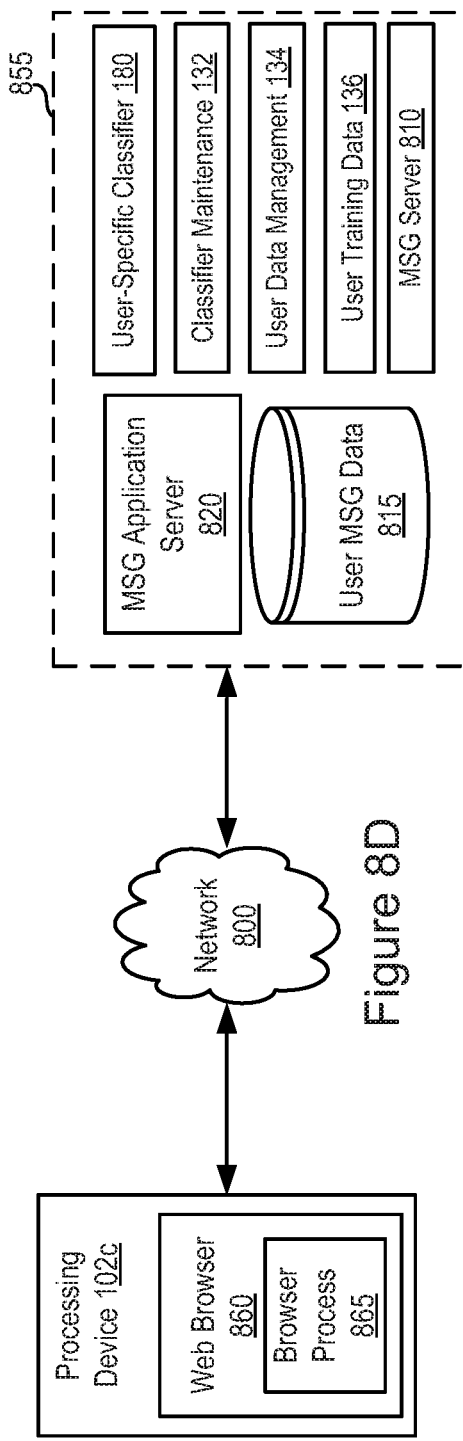

PERSONALIZED MESSAGE PRIORITY CLASSIFICATION

BACKGROUND

Numerous systems exist to allow filtering and classification of email for users. One common system is to filter for unsolicited bulk email and nefarious messages, commonly referred to as SPAM email. Email services typically place SPAM emails in a special folder, allowing users to review this classification prior to deleting or otherwise acting on the email. Other systems exist to allow marking of certain types of email as more important than others in a user's inbox. For example, one email system uses an "importance" marker which is based on who you email, and how often you email them, which emails you open, which emails you reply to, keywords that are in emails you usually read and which emails you mark with a star, archive, or delete. Another email system places mail into a "clutter" folder and a SPAM folder, with the clutter folder by analyzing email habits, and based on past behavior, determines the messages that one is most likely to ignore. It then moves those messages to a folder called Clutter, where one can review them later.

SUMMARY

The disclosure includes a method for automatically assigning a priority rank to messages of a user. A system of one or more computers can be configured to perform operations or actions to implement the method by virtue of having software, firmware, hardware, or a combination of them installed on the system that in operation causes or cause the system to perform the actions. The method includes accessing messages addressed to a user in an message data store. The method also includes for each message of one or more of the messages in the message data store, parsing the message for features present in the message, calculating a predicted intensity score for the message based on the features present in the message using a user-specific classifier, the classifier created from user training data for the user which includes at least prior user messages; and assigning a priority rank to the message based on the predicted intensity score. The method then provides the assigned priority rank for the message ranked to a processor for further processing of the message based on the priority rank.

In another aspect, the features include at least a sender of the message, metadata identifying a characteristic of the message, or metadata regarding content of the message.

The method may further comprise creating the user-specific classifier by accessing user training data for the user and training the user-specific classifier using a machine learning process based on the user training data, at least some of the messages in the user training data being labeled with an activity intensity score.

The method may further comprise calculating an activity intensity score for each of a plurality of the messages in the training data by analyzing user activity associated with each message, determining a respective value for one or more activities associated with the user's activity for the message, calculating the activity intensity score for the message as a weighted sum of all the determined activity values. The activity intensity score may then be assigned as a label for the message in the user training data.

The method may further include partitioning the activity intensity scores into a number of groups, each group characterizing one priority rank, and assigning the priority rank to each message in the message data store based on the group into which the predicted intensity score the message falls.

In the method, the user activity may describe user actions taken in response to receipt of the message, and the user activities may include at least one of opening the message, closing the message, reading the message, forwarding the message, drafting a reply to the message, marking the message read, marking the message unread, marking the message for follow-up, a length of a reply to the message, forwarding the message, or time the user spent composing a reply to message or a forwarding message.

In another aspect, the technology includes a non-transitory computer readable medium storing computer instructions that when executed, automatically assign a priority to messages addressed to a user. The instructions when executed by one or more processors cause the one or more processors to access messages addressed to a user. The instructions further cause the one or more processors to perform steps of: for each message of one or more of the messages addressed to a user, parsing the at least one message for features present in the message; calculating a predicted intensity score for the at least one message based on the features present in the at least one message using a user-specific classifier, the classifier created from user training data which includes at least prior user messages and an activity intensity score associated with each of the prior user messages, each feature having an assigned value, the calculating summing weighted feature values for all features parsed from the at least one message; and assigning a priority rank to the message based on the predicted intensity score. The non-transitory computer readable medium also includes providing the assigned priority rank for each message ranked to a processor for further processing of the at least one message based on the priority rank.

The technology further includes a messaging device. The messaging device includes: a memory storage including instructions and a user data store configured to store user message data; and one or more processors in communication with the memory. The one or more processors execute the instructions to access messages in the data store addressed to a user; The one or more processors execute the instructions to, for each message: cause the processor to retrieve, from the at least one message, features present in the message; calculate a predicted intensity score for the message based on features present in the at least one message using a user-specific classifier, the classifier created from user training data which includes at least prior user messages and user activity data associated with the prior user messages, each feature having an assigned value, the calculation being a weighted sum of feature values for all features retrieved from the at least one message; and assign a priority rank to the message based on the predicted intensity score. The messaging device also causes the one or more processors to further process the at least one message based on the priority rank.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7A is a table illustrating the prediction of priority rank of messages based on the contextual features of the messages.

FIG. 7B is a table illustrating the calculation the actual importance of messages based on user activities.

FIG. 7C illustrates a table showing multiple activities may be considered for each message to calculate an activity intensity score.

FIG. 7D is a table illustrating monitoring of the classifiers' performance for each user by keeping track of the prediction error for each message.

FIG. 8A is a block diagram illustrating a first embodiment of an implementation of a classifier and classifier maintenance application/service.

FIG. 8B is a block diagram illustrating a second embodiment of an implementation of a classifier and classifier maintenance application/service.

FIG. 8C is a block diagram illustrating a third embodiment of an implementation of a classifier and classifier maintenance application/service.

FIG. 8D is a block diagram illustrating a fourth embodiment of an implementation of a classifier and classifier maintenance application/service.

DETAILED DESCRIPTION

Figure 1:
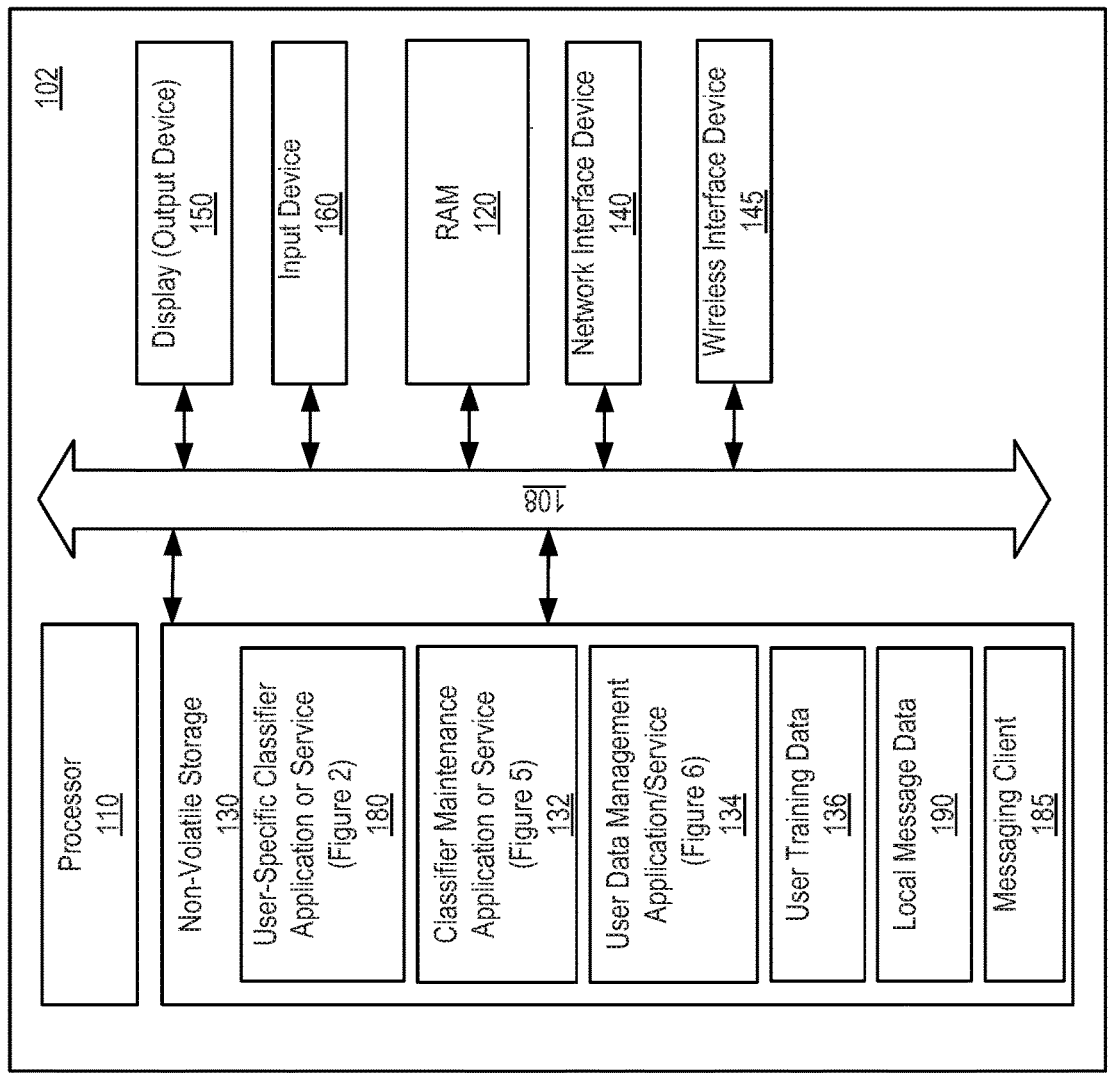
FIG. 1 is a block diagram illustrating a processing device utilizing the present technology.

Technology is disclosed to provide a user-specific prioritized ranking of messages received by a user, for example, in an email system. Other types of message systems are contemplated including, for example, instant message systems (e.g., Short Message Service messages), social networks (e.g., social network posts), voicemail message systems (e.g., voice messages), microblog systems (e.g., microblog posts), and so on. A user-specific classifier assigns a priority rank to messages received by a user and outputs the assigned priority rank to a messaging client for display, and/or to other processes which may take advantage of the assigned priority rank. The user-specific classifier is created by a classifier maintenance application/service using machine learning techniques applied to historical message training data for the user. A model developed by the classifier maintenance application/service is based on features in user messages which can be used to predict and rank the importance of messages to a user. Features analyzed in training the user-specific classifier include social relationships, message content, and message metadata. User activities on received messages are used to verify the accuracy of the original message ranking and to build new classifiers. The classifier may be updated as new messages and additional user activities on new messages are tracked over time.

The user-specific classifier assignment of priority rank may be used in numerous ways to improve the operation of the processing devices and messaging efficiency. In one embodiment, the priority rank may be displayed in a user interface for a messaging client folder for the user, allowing the user to decide based on the rank to sort, filter or otherwise manipulate the processing of the message within a messaging interface based on the priority rank. In other embodiments, the message priority rank may be used in determining whether to retrieve message data, for example retrieving an email from an email server The technology provides particular advantages in mobile devices where more limited processing power is available and network bandwidth may be at a premium. The technology allows users to, for example, prioritize email retrieval from email servers which connect to mobile devices via slower network connections by, for example, prioritizing retrieval of messages from network connected servers. In this context, an email server can comprise one or more processing devices executing an email server program, and one or more processing devices configured to provide email server services in response to connections from an email client and operated by an enterprise or commercial email service.

The technology is implemented by a user-specific classifier and a classifier maintenance application/service. The user-specific classifier operates to predict a priority rank for new messages received by a user and as such may execute on a processing device utilized by the user with a messaging client, on a messaging server, or within an enterprise processing environment with a plurality of messaging servers. The classifier maintenance application/service operates to create user-specific classifiers based on historical messaging data of the users and update existing user-specific classifiers as new user messaging data becomes available.

FIG. 1 is an example processing device 102 suitable for use in implementing the present technology in various embodiments. Although the processing device illustrated in FIG. 1 is one embodiment of implementing the functional components of the technology, the components may reside and be executed on multiple processing systems in other configurations. Examples of such configurations are illustrated in FIGS. 8A-8D. The processing device 102 may include, for example, a processor 110 (e.g., a microprocessor), random access memory (RAM) 120, non-volatile storage 130, a display unit (output device) 150, an input device 160, and a network interface device 140. The components are coupled to a bus 108. In certain embodiments, the processing device 102 may be embedded into a personal computer, mobile computer, mobile phone, tablet, or other suitable processing device.

Illustrated in non-volatile storage 130 are functional components which may be implemented by instructions operable to cause processor 110 to implement one or more of the processes described below. While illustrated as part of non-volatile storage 130, such instructions may operate to cause the processor 110 to perform various processes described herein using any one or more of the hardware components illustrated in FIG. 1. These functional components include a messaging client 185, local message data 190 for the user, a user-specific classifier 180 (which may be implemented as an application or service in the processing device 102), a classifier maintenance application or service 132, a user data management application or service 134, and user training data 136. As discussed below with respect to FIGS. 8A-8D, various components illustrated in a single processing device 102 may be distributed among multiple processing devices which communicate via a network.

Non-volatile storage 130 may comprise any combination of one or more non-volatile computer readable media. The computer-readable non-transitory media includes all types of computer readable media, including magnetic storage media, optical storage media, and solid state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The processing device 102 can include a set of instructions that can be executed to cause processing device 102 to perform any one or more of the methods or computer based functions disclosed herein. Program code for carrying out operations for aspects of the present disclosure may be written in any combination of one or more programming languages, including an object-oriented programming language and conventional procedural programming languages. The program code may execute entirely on the processing device 102, partly on the processing device 102, as a stand-alone software package, partly on the processing device 102 and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

The processor 110 is configured to execute program code instructions in order to perform functions as described in the various embodiments herein. The processor 110 may be a general-purpose processor or may be part of an application specific integrated circuit (ASIC).

The processor 110 may also be a microprocessor, a microcomputer, a processor chip, a controller, a microcontroller, a digital signal processor (DSP), a state machine, or a programmable logic device. The processor 110 may also be a logical circuit, including a programmable gate array (PGA) such as a field programmable gate array (FPGA), or another type of circuit that includes discrete gate and/or transistor logic. The processor 110 may be a central processing unit (CPU), a graphics processing unit (GPU), or both. Additionally, any processor described herein may include multiple processors, parallel processors, or both. Multiple processors may be included in, or coupled to, a single device or multiple devices.

Illustrated in the non-volatile storage 130 are components for implementing a classifier maintenance application/service 132, user-specific classifier 180, user data management application/service 134 and messaging client 185. The user-specific classifier performs the methods described with respect to FIG. 2 herein. The classifier maintenance application/service 132 performs the methods described with respect to FIG. 5. The user data management application/service performs the methods illustrated with respect to FIG. 6. A messaging client may be an email, SMS, or other data messaging application which retrieves and sends messages under the control of a user of device 102.

Also illustrated in non-volatile storage 130 is local user message data 190, and user training data 136. Local message data 190 a data store of user message data or portions thereof, associated meta-data, attachments, and priority rank data which has been retrieved by device 102 using, for example, the messaging client 185. User training data 136 is labeled, user-specific data used by the classifier maintenance application/service 132 to create and update the user-specific classifier 180.

As shown, the processing device 102 may further include a display unit (output device) 150, such as a liquid crystal display (LCD), an organic light emitting diode (OLED), a flat panel display, a solid-state display, or a cathode ray tube (CRT). The display output device and 50 may be utilized to provide the user interface discussed above with respect to FIG. 1. Additionally, the imaging processor may include an input device 160, such as a keyboard/virtual keyboard or touch-sensitive input screen or speech input with speech recognition, and which may include a cursor control device, such as a mouse or touch-sensitive input screen or pad.

As illustrated with respect to FIG. 1, the classifier maintenance application/service 132 operate on the same processing device as a messaging client 185, or the various functional components of the classifier maintenance application/service 132, user-specific classifier 180 and messaging client 185 may operate on a user processing device 102 or in a processing environment including a messaging server as illustrated in FIGS. 8A-8D.

Figure 2:
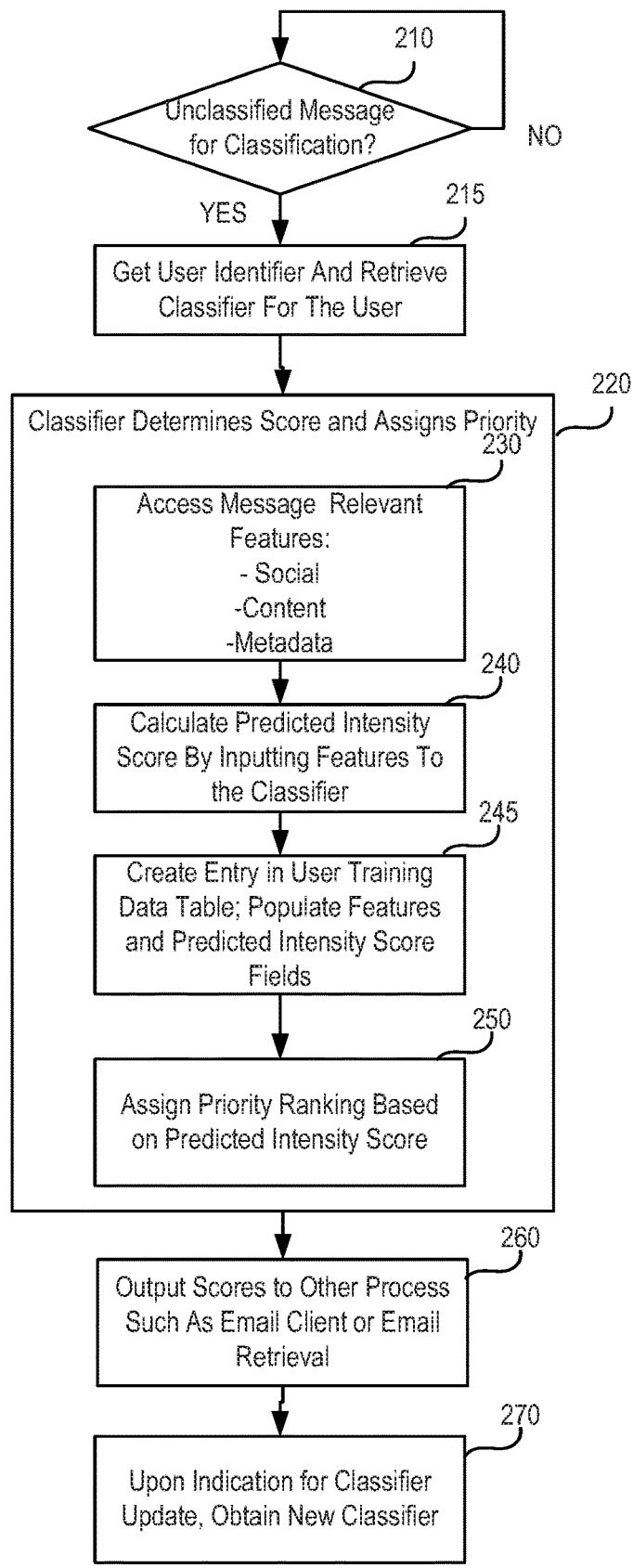
FIG. 2 is a flowchart illustrating a process in accordance with the present technology.

FIG. 2 is a flowchart illustrating a method performed by a user-specific classifier in accordance with the present technology. FIG. 2 illustrates the process performed by a user-specific classifier. The user-specific classifier may be provided on a processing device such as that illustrated in FIG. 2, on a messaging server, and/or within a processing environment which includes a number of servers under the control of an enterprise administrative entity.

At 210, a determination is made as to whether an unranked message (e.g., an email message or an instant message) is available for priority ranking. An unranked message may be any unranked message provided in a data store associated with a user message account such as a newly received message on a message server, a newly received message on a message client, or an unranked message which has not been previously ranked by the user-specific message classifier. In further embodiments, a message can be re-ranked using a user-specific classifier has been re-trained on new data.

At 215, a user identifier associated with the user is used to retrieve the user-specific classifier for whom message classification is to be performed.

At 220, a user-specific classifier determines an intensity score and assigns a priority rank to the message. The priority rank is a ranking based on a linear or non-linear ranking scale of priorities and is assigned based on a predicted intensity score calculated for each message by the classifier. Examples of a ranking scale may be, for example, a rank in a range of 2 to 3, with 3 being highest priority, or a rank in the range of 2 to 5, with 5 being the highest priority. The scale of priority may be inverted such that the lower number is considered a "higher" priority rank (i.e. more important to the user). It should be understood that the ordering and granularity of ranks (the number of ranks in the scale) may be any granularity and any order of ranks.

In one embodiment, assigning a priority rank at 220 is performed by calculating a user-specific predicted intensity score for each message. The calculation of a predicted intensity score is performed by a user-specific classifier which takes as input a plurality of features present in or associated with each such message. In some embodiments, the predicted intensity score can then be compared to a range of intensity scores for each priority ranking in the scale to provide the final priority rank for a message. The user-specific classifier is a machine learning model trained on a user-specific set of user messages and the training is performed by the classifier maintenance application/service. The user-specific classifier then applies the machine learning model on the plurality of features from a message to calculate predicted intensity scores for newly received messages. Additional aspects of the classifier maintenance application/service are discussed herein.

At 260, the priority rank is output to other processes operating on a processing device for further processing. In one embodiment, the output at 260 can be provided to a messaging client application operating on a processing device which can display the priority ranking in a user interface, such as that illustrated in FIG. 2. In another embodiment, the priority may be output to a messaging client or other message retrieval process which may utilize the priority rank to determine which messages should be retrieved from a server based on the priority rank. Yet another embodiment, the priority rank may be provided to a process operating on a message server processing device, where the process decides which messages should be provided to a message client based on the priority rank.

At 270, upon an indication that the user-specific classifier is to be updated, a new (or updated) classifier is obtained from the classifier maintenance application/service. The process of creating a user-specific classifier is described with respect to FIG. 5.

The priority ranking thereby provides an advantage in optimizing the bandwidth and communications between, for example, a messaging client a message server, by allowing those messages with higher priority rank to be downloaded first, or allowing only those messages with a selected priority rank or threshold priority rank to be downloaded. This can optimize usage of bandwidth and processing power of devices when processing messages. Hence, the technology provides specific advantages with mobile processing devices which generally communicate with message servers over a lower bandwidth network, and over networks where network bandwidth is more expensive than wireline or WiFi based network connections. In such cases, enterprise administrators or users can determine, for example, to only download one or more levels of high-priority messages in order to save network bandwidth.

The user-specific classifier determination and assignment of priority rank at 220 may occur using sub steps 230, 240, 245, and 250, as illustrated in FIG. 2. At 230, an unclassified message is accessed to acquire relevant features which may be present in or associated with the message. Such features may include, but are not limited to, social features, content features, and message metadata. Social features include features such as who the sender of the message is, how many co-recipients (in addition to the user) are present in the "to" line of the message, the identities of the co-recipients, and any other factors which may identify a relationship between the recipient (the user for whom the classification is being made) and other recipients or the sender of the message. Content features include, for example, specific keywords found in the message and the length of the message. In one embodiment, a user or an enterprise may identify specific keywords which, when present, would increase a priority ranking assigned to the message. Metadata may include whether the message is forwarded from the sender to the recipient, whether the message is a reply from the sender to the recipient, and the date and time stamp of the message. Forwarded messages and replied messages may indicate a higher importance of the message in that a replied message, for example, indicates a response to a user-originated message while forwarded messages may indicate that the sending (forwarding) user considered the message of sufficient importance to pass the message to the recipient.

At 240, a predicted intensity score is calculated for and assigned to the message based on the features defined in step 230 by the user-specific classifier model. Development of the user-specific classifier model is discussed below. The predicted intensity score may, in one embodiment, be a weighted summation of feature values assigned to each of the features found in an individual message. Machine learning techniques are used to derive the weights for each of the features defined in the model and this process is called the training process.

After training, a classifier is generated for the user to whom the training messages belong and the classifier can be used to predict intensity scores of new messages of this user. The classifier takes as input features extracted from the metadata of the messages (e.g., emails) or the content of the messages. Features may be customized by a user or an enterprise administrator. Examples of features are illustrated in FIG. 7A.

To calculate the predicted intensity score, values are assigned to the features for the message and the feature values are then provided to the trained classifier which predicts an intensity score based on the values. Examples of values assigned to features are illustrated in FIG. 7A. These values reflect how a certain feature presents in a message or associates with a message. For example, the feature "length" has value "150" for message with ID 1 which means the length of message with ID 1 has 150 words in its message body. In accordance with the technology, machine learning techniques are applied to user training data to generate an intensity score model, which is a user-specific classifier to process and score new messages received for the user. Generally, training data for a supervised machine learning (i.e. classification) algorithm consists of a target/outcome variable which is to be predicted from a given set of features. In this case, the target variable can be calculated as the actual user activity score discussed later. With training, a learning algorithm creates a function which maps the features to the target variable. Examples of supervised learning which are suitable for use in the present technology include Linear Regression, Decision Tree, Random Forest, K-Nearest Neighbors (KNN), Logistic Regression, and Support Vector Machine (SVM), as well as numerous others.

Any of the aforementioned machine learning techniques can be utilized in the present technology. Each user for whom the training data is available will have a model developed specifically for the user. The user-specific classifier executes the predicted intensity score calculation provided by the model on new messages received for the user to provide a priority ranking. For example, where the machine learning is implemented by a linear regression, one will obtain a linear equation in which each feature will have an associated weight/coefficient and the equation combines the weighted feature values into a predicted intensity score. In such a classifier, a coefficient assigned by the machine learning model can be very high for example, for the feature "Sender's social relationship" and lower for the feature "length".

The predicted intensity score can be added to the user's training data. At 245, an entry is created in a user's training data table in user training data 136. This entry populates feature scores and the predicted intensity score in fields in the training data 136. Note that this entry of training data is not complete and cannot be used in training until the actual activity score is calculated once user has dealt with that particular message and appended to this entry in the user training data table. That step is illustrated in step 655 in FIG. 6. Examples of training data are illustrated in FIG. 7D.

At 250, the predicted intensity score is compared against a scale which applies a priority ranking based on whether or not the predicted intensity score falls within a particular score range. In a basic example, consider a linear ranking scale for intensity scores between 0 and 1 where the priority ranking is 1 through 3, with "1" being the lowest rank and "3" being the highest rank. In such an example, a message with a total predicted intensity score of 0-0.33 may result in a "1" priority rank, a message with a predicted intensity score of 0.34 to 0.66 may result in a "2" rank, and a message with a predicted intensity score of 0.67 or higher may result in a "3" rank. Both the scores and the scale are merely exemplary, and the ranges for each rank need not be equal or evenly distributed. The result is a priority ranking for each message on which the classification method of FIG. 2 operates. As noted above, this classification rank can be utilized to provide a user interface or in processing operations which can prioritize operations on the message as discussed herein.

At 250, a clustering algorithm can be utilized to provide a rank scale within which a particular total predicted intensity score falls in order to rank new messages with a priority rank as they arrive. For example, a K-means clustering algorithm can be utilized where K is the number of priority ranks one wishes to use. K-means clustering partitions n observations into k clusters (ranks 1-3 or ranks 1-5, for example) in which each observation belongs to the cluster with the nearest mean, serving as a prototype of the cluster.

Figure 3:
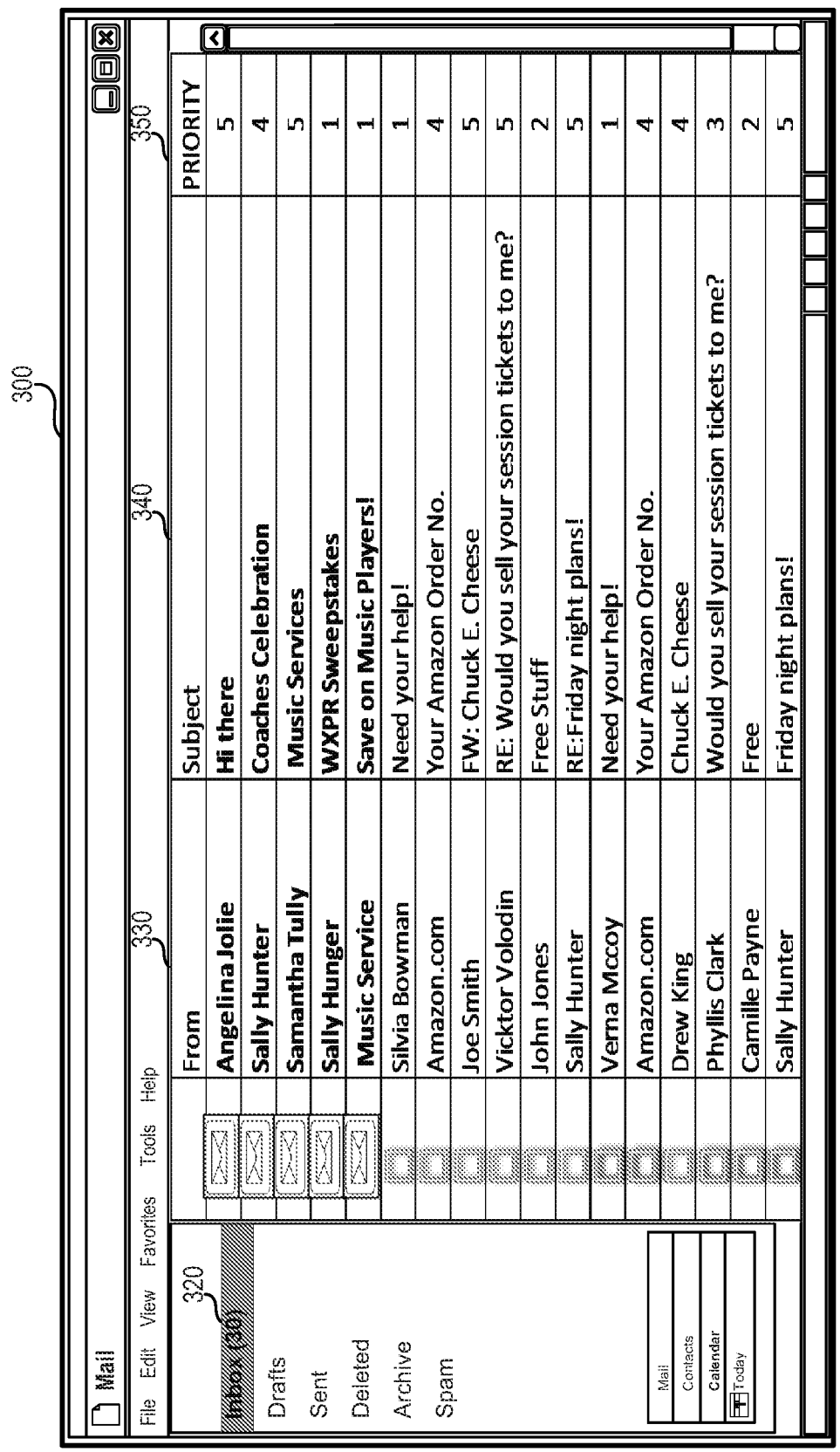
FIG. 3 is an exemplary display provided by a processing device to a display apparatus communicating with the processing device illustrating an aspect of the present technology of prioritizing messages in a folder.

FIG. 3 illustrates one exemplary application of the priority ranking in a display in a user interface. User message interface 300 may be provided, for example, on a display (such as display output device 350) coupled to a processing device such as that illustrated in FIG. 3. The inbox interface may be created by a messaging application (such as an email client) operating on a processing device or in a Web-browser process displaying a messaging application interface provided by a web application server. In the user interface 300, a messaging interface having a series of folders such as inbox 320, drafts, Sent items, Deleted items, Archive items and Spam is illustrated. In the example in FIG. 3, Inbox 320 is selected and displayed, and includes a From column 330, a Subject column 340, and a Priority column 350. In the priority column 350, a priority rank from 1-5 is associated with each message listed in the inbox interface 300. It should be recognized that the process specific example of the priority rank illustrated in FIG. 3 is exemplary, and other uses of the priority rank may be utilized. For example, the priority rank may be illustrated by colored highlighting, alternative text listings such as changing the font of certain priority messages to italics, or other visual indicators.

Figure 4:
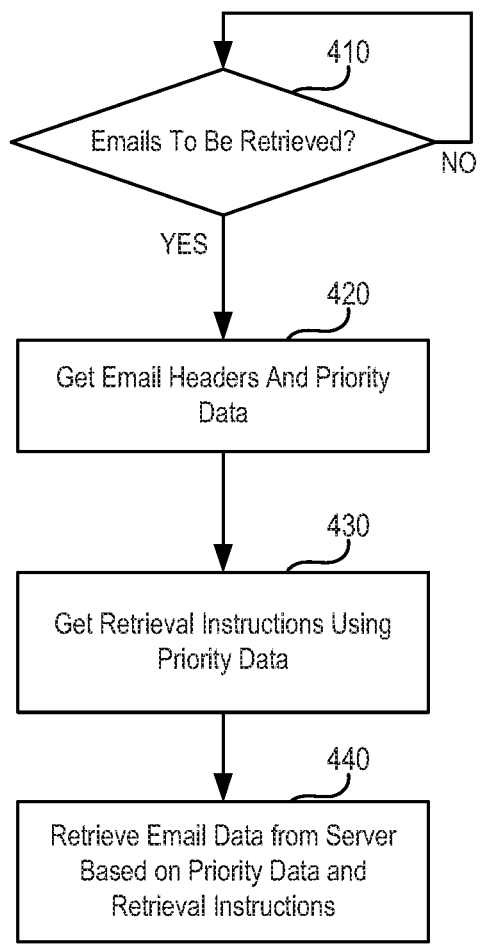
FIG. 4 is a flowchart illustrating a process utilizing prioritized message data in accordance with the present technology.

FIG. 4 is a flowchart illustrating another use of the priority rank for each of the messages—prioritizing the downloading of messages from a server. FIG. 4 is described in the context of an email client and server. Once a group of messages has been ranked, a processing device may prioritize when and if messages are to be retrieved, or may prioritize and determine when message elements requiring large data bandwidth, such as attachments or images, are retrieved by an email client from an email server. There are numerous types of protocols which are used by email clients to connect to email servers, including for example Post Office Protocol (POP), Internet Message Access Protocol (IMAP) and ActiveSync. Certain protocols allow more than mere sending and retrieval of email, but further allow retrieval of, for example, a list of new messages, message summaries and/or content of explicitly selected user emails. These features of such protocols can be used in conjunction with prioritization to provide retrieval instructions which can optimize bandwidth usage between a messaging client and a messaging server.

While FIG. 4 will be described with respect to the process running on an email client, it will be understood that the process of FIG. 4 may be run on the email server as well. Initially, at 410, a determination is made as to whether any messages are available for retrieval. This determination may be made by the email client based on a connection to the server and the protocol in use. At 420, the email client may initially retrieve message headers and their priority rank data associated with the emails identified in the headers. Based on the priority data, retrieval instructions may be provided by the email server at 430. The retrieval instructions may include an instruction to retrieve all of the highest priority ranked messages first, followed by retrieving messages of sequentially lower rank priority. For example, an email client may first retrieve all messages marked with the priority rank of "3" (on a scale of 1-3 with 3 being the highest), followed by a priority rank of "2", and followed by those with a priority rank of "1". Alternatively, the email client fetch instructions may determine only to retrieve those messages with a priority rank of "2" or "3", leaving those with a lower priority rank of "1" to be retrieved at a later time. The instructions may be based on the type of network or based on the type of network connection that the client has with an email server. Different instructions may be used when the connection is a high bandwidth connection versus a lower bandwidth connection. At 440, messages are retrieved from the server based on the priority data and retrieval instructions.

Figure 5:
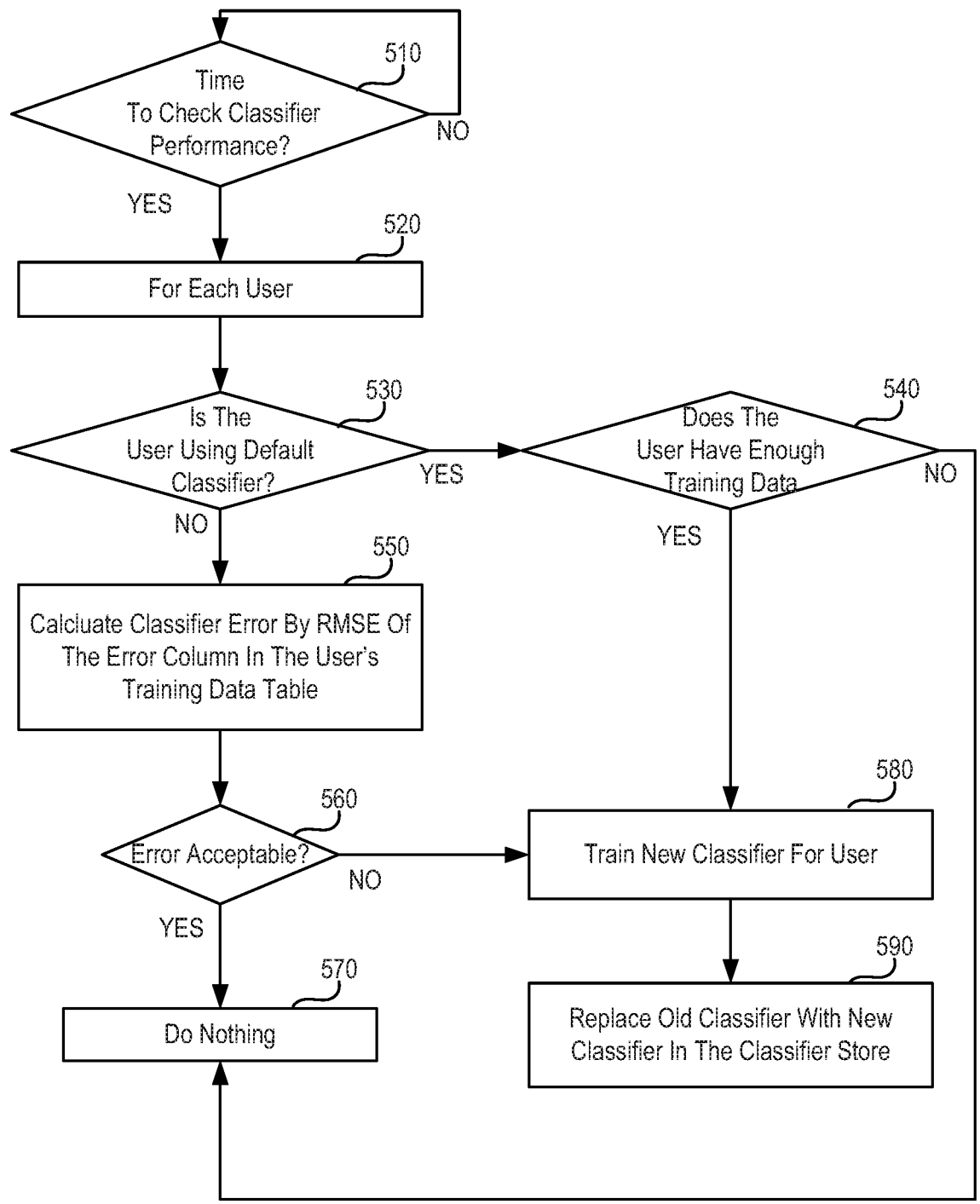
FIG. 5 is a flowchart illustrating a process for creating and updating user-specific classifiers for a user in accordance with the present technology.

FIG. 5 illustrates a process is performed by a classifier maintenance application/service 232 to create a user-specific classifier 280 which can perform the method illustrated in FIG. 2.

At 510, a determination is made as to whether user-specific classifier performance is to be checked. The threshold for determining whether to check classifier performance may be based on time or on a number of messages received. The performance may also be checked based on a request from a system administrator or a user. Whether or not to update the classifier at 530 can be based on, for example, a threshold number of messages being received following use of the user-specific classifier, a periodic update occurring at specific time intervals, or at the specific request of the user or a messaging server administrator to update the classifier. If it is not time to check the classifier at 510, the method continues to wait for the threshold to be reached.

If it is time to check classifier performance, for each user at 520, a determination is made as to whether or not a user has a user-specific classifier or is using a default classifier. For new users for which no training data is available, the user may be provided with a "default" classifier. In order to create a user-specific classifier, training data based on a user's existing message data is utilized by machine learning technology to create a model upon which the classifier scores and ranks messages. For a new user a default classifier may be provided which is created by the applying a defined set of values and weights to commonly seen factors in a random sampling of training message data from other users of a messaging system. This may be performed manually by a programmer assigning default values and weights to certain message features, or by running machine learning technology on a data store of training data which is gathered from a cross-section of users of the message system. Enterprises or the user may be allowed, for example, to identify certain features or keywords that can be assigned a higher weight in calculating a predicted intensity score for a message and thereby influence the initial, default classifier used by the new user. In other embodiments, these user or enterprise specific weightings can be carried through to user-specific classifiers developed in accordance with the method of FIG. 5.

If the user is using the default classifier at 530, a determination is made at 540 as to whether the user has enough training data available for the user.

Once a user begins receiving message data, user activity on messages received by the user is gathered and the messages are labeled (see FIG. 6) to create training data for use in creating a user-specific classifier. In this context, user activities may be tracked by a messaging client or an agent interacting with a messaging client to provide data on how users interact with messages through the messaging client. As discussed herein, a messaging client may be executed on a user processing device or may be an application running at least partially on a messaging application server designed to be run on the application server and provide an interface in another application running on a user processing device, such as a web browser. User interactions with a message such as opening, closing, reading, editing, drafting, and marking read/unread all take place using the messaging client. Many messaging clients include application programming interfaces (APIs) which expose certain commands and user activities to other programs. In the present technology, user activities may be tracked by a messaging client used in conjunction with the technology. The messaging client may be a modified commercial or non-commercial messaging client which may be specifically written or modified to track user activities described herein. User activity tracking can include the foregoing activities—opening, closing, reading, editing, drafting, and marking read/unread—on each message as well as tracking such activities on both inbound and outbound mail. For example, if a user receives an inbound mail message from their boss, and the user opens the message immediately, the timestamp of retrieval and the command executed to read the message (by opening the message) provide a time difference indicating how fast the user read the message. The length of the display—how long the user keeps the message open—provides a time indicating how long the user reads the message. As should be understood, each command action executed by the user can be read and tracked by code in the messaging client to derive user action data as discussed herein.

Actual intensity scores can be calculated with the observations of users' activities in handling the messages and can be calculated as weighted summation of a plural of individual activity scores each of which reflects whether or not a particular action has occurred and how intense this action has occurred in handling a particular message. User activities can include, for example, actions performed by the user related to the user's manipulation of messages in the user's inbox, or lack of actions (messages sitting in the inbox without being opened). This can include whether or not a user has replied to a message, forwarded a message, read a message, not read a message, deleted a message upon opening it, deleted a message without opening it, marked a message read, marked a message unread, marked a message for follow-up and various other activities or variations of each of the foregoing activities. For example, if a user has drafted a reply to or forwarding of a message, a feature may track the length (in characters) of the draft, how long in time it took the user to compose the draft, and how rapidly in time the user replied or forwarded. An individual action's score may be a normalized among all users. For example, an action score representing "reply length" can have a value of 0.9 if the reply length is more than 100 words and 90% of reply messages are within 100 words. Each action score is given a weight in calculating the total activity score. For example, if the action "read" is considered most important in handling a message, the action score of number of reads will be given a weight of 0.5, while the time used in composing the reply is only given a weight of 0.05. Table 730 in FIG. 7C give an example of calculating a total activity score for a particular message based on different user actions and associated weights. The weight for a particular action can be the same across all users, unlike in a linear regression model for the user-specific classifiers, the weights are usually different from one user to another.

The actual intensity scores calculated based on the user's activities on each received message may be used as labels in the training data (step 245) and are illustrated in FIG. 7D. In another alternative, a priority rank is generated based on the actual intensity score and the priority rank may be used as labels to the training data and supplement or replace the actual intensity score label. In another alternative, both the intensity score and the priority rank may be used to label the messages.

The process to create and maintain a classifier per user to predict the priorities of this user's messages is described in FIG. 5. If the user has enough training data at 540, then at 580, a new classifier is trained for the user and at 590, the old (or in-use) classifier is replaced for the user.

If the user is not using the default classifier at 530, then a calculation of the classifier error can be made using, for example, a root-mean-square error (RMSE) calculation based on the calculated errors in the user's training data which comprise an error between a predicted intensity score and an actual intensity score for each message. The prediction error for each message is stored in the user's training data, and created as discussed below with respect to FIG. 6. At 550, the total classifier error is calculated by applying the RMSE calculation to the error column data (FIG. 7D) in the user's training data table.

If the error is acceptable at 560, then the method does not update the classifier and waits at 510 for the next threshold. If the error is not acceptable at 560, then a new classifier is trained for the user at 580.

Figure 6:
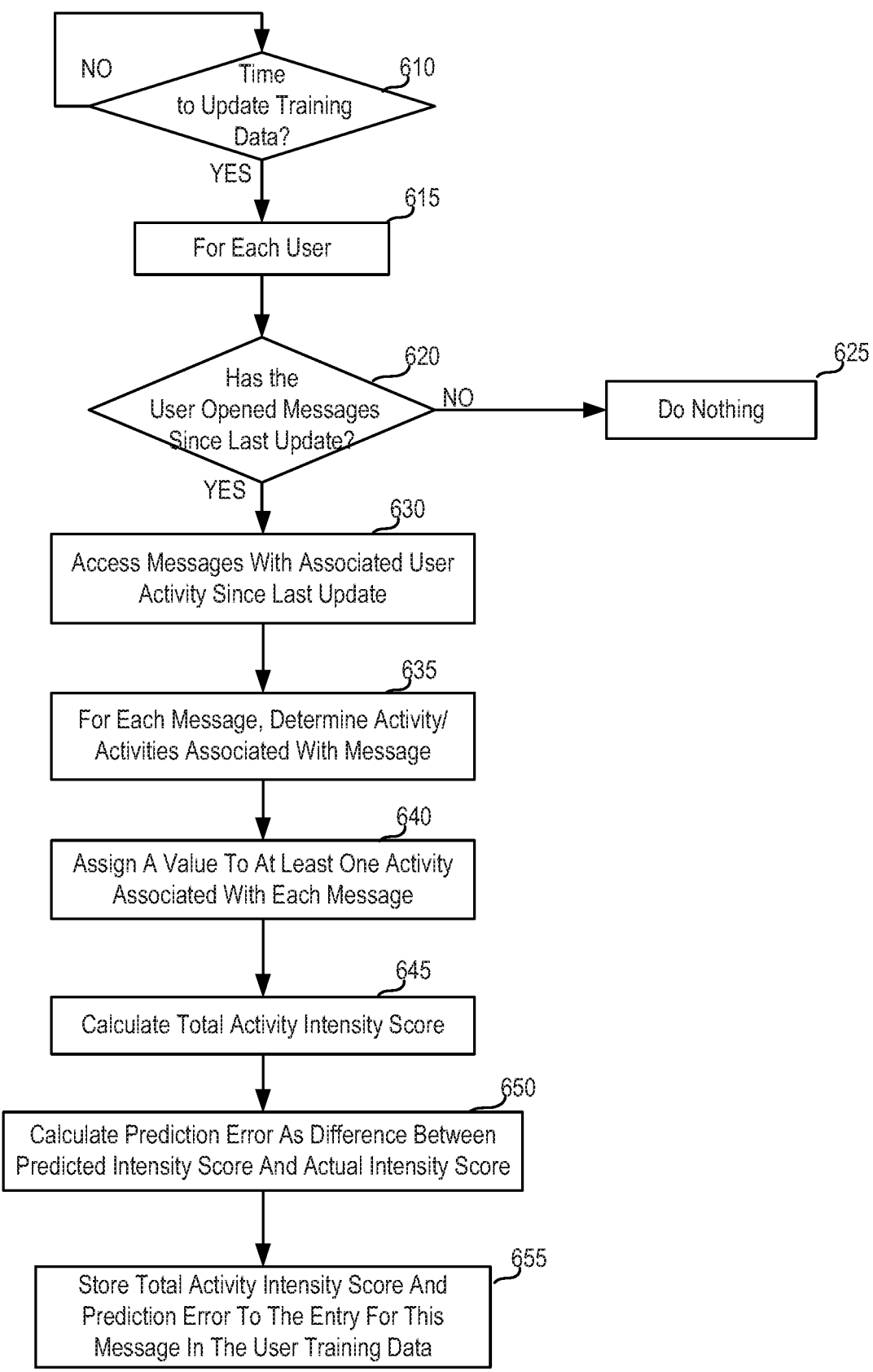
FIG. 6 is a flowchart illustrating a process for calculating an actual activity intensity score and generation of training data.

FIG. 6 illustrates a process for calculating an actual intensity score and labeling new training data for each user. At 610, a determination is made as to whether the training data should be updated. As with determining whether the classifier should be updated, this determination may be made based on a time period, number of emails received or upon an initiation by a user or administrator.

If it is time to update training data, then at 615 for each user, a determination is made at 620 as to whether the user has opened messages since the last update of training data. If not, the method does nothing until the next status check (step 610) of training data.

If the user has opened messages since the last update to the training data at 620, then at 630, messages with associated user activity occurring since the last update to the training data are accessed. At 635, for each message, the activity or activities associated with each message are determined.

At 640, a value is assigned to at least one activity associated with each message. In one embodiment, all activities associated with each message may have values assigned to them. In an alternative embodiment, any one or more activities have values assigned to them. At 645, these values are weighted and summed into a total activity score.

At 650, a prediction error is calculated as a difference between the predicted intensity score and the actual intensity score.

At 655, the total activity intensity score and the prediction error are stored to the entry for the message in the user training data.

The resulting training data table is illustrated in FIG. 7D. As shown therein, for a given message (1, 2, 3, . . . ) any number of features (Feature 1-Feature N) may have a value assigned relative to the email. These features are calculated to provide a predicted (intensity) score. An actual intensity score may be compared to the predicted intensity score to provide a per-message prediction error.

FIG. 7A illustrates a table 710 showing a set of features and associated messages. Illustrated therein is data for 4 messages (Message ID: 1-4) and associated predicted intensity scores and priority ranks based on the data in the message. For example, in FIG. 7A message 1, which is a message from the user's spouse, has a length of 150 words, no CC'd users and includes the keywords "vacation" and "expense", is not forwarded but is replied, is predicted to have an intensity score of 0.55 based on which a priority rank 3 is generated for this message. Message 2, which is from an identified friend, has a length of 100 words, has no cc'd users, three co-recipients, includes the keywords "shopping" and "time", is not forwarded but is replied, is calculated to have an intensity score of 0.100. Likewise, message 3 has a score of 0.85 and message 4 has a score of 0.15 predicted based on the features therein.

FIG. 7B illustrates a table 720 of user activity data for a message and how a single activity on a message may correlate to an activity intensity score. Message 1 which is read and has been read five times receives a score of 0.45. Message 2 which is deleted receives a negative score –0.1; message 3, which sits in the user inbox unread, receives score 0, and message 4 which is replied to and has a 200 word length in the reply which takes five minutes to compose and is composed immediately upon receipt receives a score of 0.8.

FIG. 7C illustrates how multiple activity factors may be used for each message. Table 7C is an example of the activity factors associated with a message: the user read the message five times, composed a 150-word-count reply to the message, spent 5 minutes in composing the reply, however waited 4 hours from reading the message the first time to starting to reply to the message, no deletion without opening applied here (a negative score would be added if so), the message was deleted after reply, and the message was not forwarded. Each factor has an associated weight, a value and assigned score based on the value, resulting in an activity score which is the multiplication of the weight and the assigned score. The individual activities scores per action are then summed to provide a total activity intensity score. In this case. the total activity intensity score is 0.42.

FIGS. 8A through 8D illustrate various aspects of the processing devices which may execute a message client, a user-specific classifier application or service, user data management, and a classifier maintenance application/service, and the relationships of the processing devices to other components, which may enable the present technology. FIG. 8A illustrates an embodiment wherein a message client 185, user-specific classifier 180, classifier maintenance application/service 132, user data management application/service 134, user training data 136 and local user message data 190 all reside on a processing device 102. Processing device 102 illustrated in FIG. 8A may be configured as processing device 102 illustrated in FIG. 1, with numerous components shown in FIG. 1 omitted for clarity in FIGS. 8A through 8D. In the embodiment illustrated in FIG. 8A, processing device 102 connects via a network 800 to a message server 810 which provides user message data from a server message data store 815 to the message client 185. Message server 810 may be provided in a processing environment 825 which includes the message server 810 and user message data store 815. The processing environment 825 may include a single processing device executing a message server program, and multiple processing devices configured to provide message server services in response to connections from a message client and operated by an enterprise or commercial message service. Hence, the message server 810 and message data store 815 may be on one processing device or multiple processing devices. Network 800 may comprise, for example, the Internet and message server 810 may be coupled via network 800 to other processing devices (not shown) with other message servers to send and receive messages to and from a user of processing device 102.

Numerous protocols allow message client 185 to connect to and communicate with message server 810 and are well known. Message server 810 may comprise any of a number of different types of message servers including a private message server run by the user, an enterprise message server run by a commercial or other entity, or a message service such as those commercially known and operated by message service providers such as Google and Yahoo. In the example illustrated in FIG. 8A, the processing device 102 builds each user-specific message classifier, as well as processes messages using the user-specific classifier in order to provide the ranked messages discussed herein.

FIG. 8B illustrates a first variation on the configuration illustrated above where the classifier maintenance application/service 132 is resident in a processing environment 835. Message client 185, user-specific classifier 180 and local user message data 190 are resident on a processing device 102a. The classifier maintenance application/service 132, user data management application/service 134, and user training data 136 all reside on a processing device 835 along with a message server 810 and server message data store 815. With the classifier maintenance application/service 132 operable in a processing environment 835, the classifier maintenance application/service 132 can output either new or updated user-specific classifiers 180 to the processing device 102 via the network 800.

FIG. 8C illustrates an embodiment wherein the classifier maintenance application/service 132 and user-specific classifier 180 are provided in a processing environment 845, along with classifier maintenance application/service 132, user data management application/service 134, user training data 136 and message server 810 and data store 815. In this context, labeling and rank of user messages can occur in the processing environment 845 prior to messages being transmitted to the message client 185.

FIG. 8D illustrates an embodiment where the classifier maintenance application/service 132, user-specific classifier 180, user data management application/service 134, and user training data 136 are all present in the processing environment 855. Also provided is a message interface application server 870. Application server 870 may provide an application suitable for use in a web browser 860 to the processing device 102c in response to a request from device 102c using well known techniques. As is known, a web-based message service maintains user data in a processing environment and provides an interface and message application which is executed in a browser process 865 in a web browser 860 on a client device (processing device 102*c*). In this embodiment, user message is maintained in the processing environment 855, and the message viewed, and activities taken, in the bowser process 865. Activities and metadata can be accessed by the user-specific classifier 180 and classifier maintenance application/service 132 within the processing environment and stored in the message data store 815. The interface provided by the message application server may be the interface illustrated in FIG. 1 herein.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The technology advantageously provides a method for automatically assigning a priority rank to messages of a user. The processor-implemented method includes accessing messages addressed to a user in a message data store. The method also includes, for each message of one or more of the messages in the message data store, parsing the message for features present in the message, calculating a predicted intensity score for the message based on the features present in the message using a user-specific classifier, the classifier created from user training data for the user which includes at least prior user messages; and assigning the priority rank to the message based on the predicted intensity score. The method also includes providing the assigned priority rank for the at least one message ranked to a processor for further processing of the email based on the priority rank.

In another aspect, the technology includes a non-transitory computer readable medium storing computer instructions that when executed, automatically assign a priority rank to a message addressed to a user. The instructions when executed by one or more processors cause the one or more processors to access messages addressed to a user; The instructions when executed by one or more processors cause the one or more processors to, for each message of one or more of the messages addressed to a user, perform the steps of: parsing the at least one message for features present in the message; calculating a predicted intensity score for the at least one message based on the features present in the at least one message using a user-specific classifier, the classifier created from user training data for the user which includes at least prior user messages and an activity intensity score associated with each of the prior user messages, each feature having an assigned value, the calculating summing weighted feature values for all features parsed from the at least one message; and assigning the priority rank to the message based on the predicted intensity score. The non-transitory computer readable medium also includes providing the assigned priority rank for the at least one message ranked to a processor for further processing of the at least one message based on the priority rank.

The technology further includes a messaging device. The messaging device includes: a non-transitory memory storage including instructions and a user data store configured to store user message data; and one or more processors in communication with the memory. The one or more processors execute the instructions to access messages in the data store addressed to a user. The one or more processors further execute the instructions to, for each message of one or more messages in the data store, cause the processor to retrieve, from the at least one message, features present in the message. The one or more processors execute the instructions to calculate a predicted intensity score for the message based on features present in the message using a user-specific classifier. The classifier is created from user training data which includes at least prior user messages and user activity data associated with the prior user messages, each feature having an assigned value, the calculation being a weighted sum of feature values for all features retrieved from the at least one message, and assign a priority rank to the message based on the predicted intensity score. The messaging device also causes the one or more processors the message based on the priority rank.

The technology thus provides a system and method of improving the performance of messaging systems such as message systems by allowing processing devices to process messages based on an individual, automatically assigned, priority rank for each message. The priority rank can be displayed with a single message folder in a user interface for a message application. Processing on the messages, including determining which messages and which portions of which messages should be retrieved to a message client based on the priority ranking. The priority ranking can be used to automatically filter higher priority rank messages for immediate display or notification to the user.

The technology provides several advantages over existing solutions for message classification. Prior art message classification is limited to determining whether a message is or is not a particular type of message, such as an unsolicited SPAM message, and classifying that message in a separate folder. The present technology provides additional granularity of a priority ranking for messages which thereby improves the efficiency of message processing systems and finds a particular advantage in mobile device applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for assigning a priority rank to messages, comprising:
   accessing at least a subset of messages in a message data store, the subset of messages each being addressed to a user;
   for each message of one or more of the messages in the message data store:
      parsing each message for features present in the message;
      calculating a predicted intensity score for each message based on the features present in the message using a user-specific classifier, the classifier created from user training data for the user which includes at least prior user messages, the user-specific classifier configured to generate the predicted intensity score by assigning values to features in the message to attempt to match the predicted intensity score to an activity intensity score for each message, the activity intensity score comprising a numerical sum of an action value and an action weight for each user action taken on each message;
      assigning a priority rank to the message based on the predicted intensity score;
      providing the assigned priority rank for the message to a processor for further processing of the message based on the priority rank; and
   subsequently updating the user-specific classifier based on new user training data containing new user messages received after assigning the priority rank, the updating occurring based on a total user classifier error calculated from a prediction error calculated for each of the messages in the new user training data, the prediction error for each message calculated from the predicted intensity score calculated for each said new user message based on the user-specific classifier, and the activity intensity score calculated for each said new user message based on user activity with each said new user message.

2. The method of claim 1 wherein the features include at least a sender of the message, metadata identifying a characteristic of the message, or metadata regarding content of the message.

3. The method of claim 2 wherein the method further comprises creating the user-specific classifier by:
   accessing the user training data for the user; and
   training the user-specific classifier using a machine learning process based on the user training data, each of at least some of the messages in the user training data being labeled with the activity intensity score for each message and the predicted intensity score for each message.

4. The method of claim 3 wherein the method comprises calculating the prediction error for each of the messages in the user training data that are labeled with at least the activity intensity score for the message by comparing the activity intensity score for the message with the predicted intensity score for the message.

5. The method of claim 4 wherein the method further comprises calculating the classifier error based on the calculated prediction errors.

6. The method of claim 4 wherein the method further comprises:
   calculating the activity intensity score by:
   analyzing user actions associated with the message;
   determining an action value and an action weight for one or more activities associated with the user's activity for the message; and
   calculating the activity intensity score for the message as a weighted sum of each action value multiplied by the action weight for each action.

7. The method of claim 6 wherein the method further comprises:
   partitioning the predicted intensity scores into a number of groups, each group characterizing one priority rank; and
   assigning the priority rank to each message in the message data store based on the group into which the predicted intensity score for the message falls.

8. The method of claim 7 wherein partitioning is based on a numerical scale assigned by performing a clustering operation on the user training data to provide a range of priority predicted intensity scores associated with each of the number of groups.

9. The method of claim 6 wherein user actions describe user activities taken in response to receipt of the message, the user activities comprising at least one of opening the message, closing the message, reading the message, forwarding the message, drafting a reply to the message, marking the message read, marking the message unread, marking the message for follow-up, a length of a reply to the message, forwarding the message, or time the user spent composing a reply to the message or a forwarding message.

10. The method of claim 1 wherein the further processing includes determining whether to transmit message data between a message server and a client processing device based on the priority rank.

11. A non-transitory computer readable medium storing computer instructions to assign a priority rank to messages addressed to a user, that when executed by one or more processors cause the one or more processors to perform the steps of:
   accessing messages addressed to a user;
   for each message addressed to the user,
      parsing each said message for features present in the message;
      calculating a predicted intensity score for each said message based on the features present in the message using a user-specific classifier, the classifier created from user training data for the user which includes at least prior user messages and an activity intensity score associated with each of the prior user messages, the user-specific classifier configured to generate the predicted intensity score using values assigned to the features in each message, the values assigned such that the calculating approximates the predicted intensity score to an activity intensity score for each message, the activity intensity score comprising a numerical sum of an action value and an action weight for each user action taken on each message in the training data;
      assigning a priority rank to each message based on the predicted intensity score;
      providing the assigned priority rank for the message to a processor for further processing of each message based on the priority rank; and
   calculating a classifier error based on a prediction error for each of the messages in new user training data that are labeled with at least jjanll the activity intensity score calculated for each message in the new user training data based on user activity with each such message by comparing the activity intensity score calculated for each message with the predicted intensity score calculated for each message; and updating the user specific classifier when the classifier error exceeds a threshold.

12. The non-transitory computer readable medium of claim 11 wherein the instructions cause the one or more processors to further preform steps of:

creating the user-specific classifier based on the user training data for each user by accessing the user training data comprising historical messages addressed to a user;

calculating the activity intensity score for each of a plurality of messages in the user training data by analyzing user actions associated with the message;

determining an action value and an action weight for each of the user actions associated with the message;

calculating the activity intensity score for each message as a weighted sum of each action value multiplied by the action weight for each action; and assigning the activity intensity score as a label for the message in the user training data.

13. The non-transitory computer readable medium of claim 12 wherein the instructions cause the one or more processors to further preform steps of: training the user-specific classifier using a machine learning process based the activity intensity score in the user training data and the predicted intensity score calculated for the message.

14. The non-transitory computer readable medium of claim 11 wherein the instructions cause the one or more processors to further preform steps of: partitioning the activity intensity scores into a defined number of groups, each group characterizing one priority rank, and assigning the priority rank to each message based on the group the predicted intensity score each message falls within.

15. The non-transitory computer readable medium of claim 11 wherein the features include at least a social relationship, metadata identifying a characteristic of the message, content of the message and user activities on the message.

16. The non-transitory computer readable medium of claim 12 wherein the user activity is taken in response to receipt of the message, and the user activity comprising at least one of opening, closing, reading, forwarding, drafting a reply, marking a message read, marking a message unread, marking a message for follow-up, a length of the reply, forwarding the message, or time the user spent composing a reply or a forwarding message.

17. A messaging device, comprising:

a memory comprising instructions and a user data store configured to store user message data; and one or more processors in communication with the memory, wherein the one or more processors execute the instructions to:

access messages in the data store addressed to a user;

for each message of one or more messages in the data store, cause the processor to retrieve, from each said message, features present in the message, calculate a predicted intensity score for each message based on the features present in the message using a user-specific classifier, the classifier created from user training data which includes at least prior user messages and user activity data associated with the prior user messages, the user-specific classifier configured to generate the predicted intensity score using values assigned to the features in each message, the values assigned such that the calculating approximates the predicted intensity score to an activity intensity score for each message, the activity intensity score comprising a numerical sum of an action value and an action weight for each user action taken on each message in the training data, and assign a priority rank to the message based on the predicted intensity score; and calculate a classifier error based on a prediction error for each of the messages in new user training data that are labeled with at least the activity intensity score calculated for each message in the new user training data by comparing the activity intensity score for the message with the predicted intensity score calculated for the message, and update the user specific classifier when the classifier error exceeds a threshold.

18. The messaging device of claim 17 wherein the one or more processors execute instructions to:

create the user-specific classifier based on user training data for each user by executing instructions to access the user training data;

calculate an activity intensity score for each of a plurality of messages in the user training data by analyzing user actions associated with each message;

determining an action value and an action weight for each of the user action associated with the user's activity for message; and calculating the activity intensity score for the message as a weighted sum of each action value multiplied by the action weight for each action;

assign the activity intensity score as a label for the message in the user training data; and train the user-specific classifier using a machine learning process based on the user training data.

19. The messaging device of claim 18 wherein the one or more processors execute instructions to partition the activity intensity scores into a number of groups, each group characterizing one priority ranking, and assigning the priority rank to each message based on the group the intensity score each message falls within.

20. The messaging device of claim 19 wherein the user-specific classifier is created by comparing the predicted intensity score for each message in the user training data with the activity intensity score for the message in the user training data to calculate a prediction error, and calculating a classifier error based on the prediction errors of the messages in the user training data.

* * * * *

UNITED STATES PATENT AND TRADEMARK OFFICE
CERTIFICATE OF CORRECTION

PATENT NO. : 10,911,382 B2
APPLICATION NO. : 15/419629
DATED : February 2, 2021
INVENTOR(S) : Zang et al.

It is certified that error appears in the above-identified patent and that said Letters Patent is hereby corrected as shown below:

In the Claims

Column 18, Line 65 Claim 11, replace "least jjan11 the" with --least the--

Column 19, Line 4 Claim 11, replace "when_the" with --when the--

Column 19, Line 8 Claim 12, replace "preform steps" with --perform steps--

Column 19, Line 25 Claim 13, replace "preform steps" with --perform steps--

Column 19, Line 26 Claim 13, replace "based the" with --based on the--

Column 19, Line 31 Claim 14, replace "preform steps" with --perform steps--

Signed and Sealed this
Seventeenth Day of May, 2022

Katherine Kelly Vidal
*Director of the United States Patent and Trademark Office*